United States Patent
Katagiyama et al.

(10) Patent No.: US 12,546,961 B2
(45) Date of Patent: Feb. 10, 2026

(54) PLUG CONNECTOR

(71) Applicant: JAPAN AVIATION ELECTRONICS INDUSTRY, LIMITED, Tokyo (JP)

(72) Inventors: Naoki Katagiyama, Tokyo (JP); Osamu Hashiguchi, Tokyo (JP); Hideto Shimazu, Tokyo (JP); Masayoshi Kagawa, Tokyo (JP); Akihiro Tosaki, Tokyo (JP); Takayuki Tanaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 294 days.

(21) Appl. No.: 18/539,689

(22) Filed: Dec. 14, 2023

(65) Prior Publication Data

US 2024/0255715 A1 Aug. 1, 2024

(30) Foreign Application Priority Data

Jan. 31, 2023 (JP) .................................. 2023-012451

(51) Int. Cl.
*H04B 10/00* (2013.01)
*G02B 6/38* (2006.01)
*G02B 6/42* (2006.01)

(52) U.S. Cl.
CPC ......... *G02B 6/4292* (2013.01); *G02B 6/3831* (2013.01)

(58) Field of Classification Search
CPC .... G02B 6/4292; G02B 6/3831; G02B 6/389; G02B 6/3897; G02B 6/4246; G02B 6/4256
See application file for complete search history.

(56) References Cited

U.S. PATENT DOCUMENTS

| 7,264,402 B2* | 9/2007 | Theuerkorn | ......... G02B 6/3821 |
| | | | 385/71 |
| 8,272,790 B2* | 9/2012 | Belsan | ................. G02B 6/4284 |
| | | | 398/135 |

(Continued)

FOREIGN PATENT DOCUMENTS

| EP | 3514590 | 7/2019 |
| EP | 3904930 | 11/2021 |

(Continued)

OTHER PUBLICATIONS

Extended European Search Report Issued in Corresponding EP Patent Application No. 23214260.4, dated Jun. 7, 2024.

*Primary Examiner* — Agustin Bello
(74) *Attorney, Agent, or Firm* — Greenblum & Bernstein, P.L.C.

(57) ABSTRACT

In a plug connector that incorporates an optical connector and a photoelectric conversion module connected with the optical connector, the optical connector attached to an optical cable is accommodated in an end bell and the photoelectric conversion module is accommodated in a barrel inserted into a mating receptacle connector. The barrel and the end bell go in a fitting completion state (locked state) by a Z-axis-direction locking mechanism and a rotation locking mechanism around the Z axis when the end bell is fitted to the barrel and the end bell is rotated about an axial center thereof (Z axis). The end bell can be detached from the barrel when the end bell is rotated in a reverse direction to that in locking while operating the locking member functioning as a rotation lock and releasing the rotation lock.

2 Claims, 16 Drawing Sheets

(56) References Cited

U.S. PATENT DOCUMENTS

| | | | |
|---|---|---|---|
| 8,708,732 B2* | 4/2014 | Toda | H01R 13/6271 |
| | | | 439/352 |
| 10,295,764 B2* | 5/2019 | Koreeda | G02B 6/426 |
| 10,317,627 B2* | 6/2019 | Beier | G02B 6/3825 |
| 10,613,278 B2* | 4/2020 | Kempeneers | H01R 13/5202 |
| 11,086,090 B2* | 8/2021 | Wan | H01R 13/512 |
| 11,237,341 B2* | 2/2022 | Hu | G02B 6/3849 |
| 11,300,746 B2* | 4/2022 | Dannoux | G02B 6/3897 |
| 11,307,364 B2* | 4/2022 | Rosson | G02B 6/3851 |
| 11,709,328 B2* | 7/2023 | Koreeda | G02B 6/4273 |
| | | | 385/92 |
| 2010/0104355 A1 | 4/2010 | Sugimoto et al. | |
| 2010/0260456 A1* | 10/2010 | Alcaraz | G02B 6/3897 |
| | | | 385/76 |
| 2011/0280520 A1* | 11/2011 | Shimotsu | G02B 6/4201 |
| | | | 385/76 |
| 2013/0011102 A1* | 1/2013 | Rinzler | G02B 6/3818 |
| | | | 385/94 |
| 2014/0029897 A1* | 1/2014 | Shimazu | G02B 6/3807 |
| | | | 385/76 |
| 2016/0266326 A1* | 9/2016 | Gniadek | G02B 6/3817 |
| 2017/0288335 A1* | 10/2017 | Hsu | G02B 6/3816 |
| 2018/0013235 A1* | 1/2018 | Dupeux | H01R 13/53 |
| 2018/0136417 A1* | 5/2018 | Katagiyama | G02B 6/381 |
| 2018/0259721 A1* | 9/2018 | Bund | G02B 6/44465 |
| 2018/0323543 A1* | 11/2018 | Koreeda | G02B 6/36 |
| 2019/0049678 A1* | 2/2019 | Koreeda | G02B 6/3817 |
| 2020/0319413 A1* | 10/2020 | Katagiyama | H01R 31/065 |
| 2021/0167553 A1* | 6/2021 | Koreeda | H01R 24/76 |
| 2021/0333482 A1* | 10/2021 | Ishiguro | G02B 6/3869 |
| 2021/0364715 A1* | 11/2021 | Islam | G02B 6/4219 |
| 2021/0405300 A1* | 12/2021 | Koreeda | H01R 13/6277 |
| 2022/0187554 A1* | 6/2022 | Koreeda | G02B 6/4273 |
| 2022/0407264 A1* | 12/2022 | Li | H01R 13/6275 |
| 2024/0255715 A1* | 8/2024 | Katagiyama | G02B 6/389 |

FOREIGN PATENT DOCUMENTS

| | | |
|---|---|---|
| JP | 2018-40820 | 3/2018 |
| JP | 2019-32432 A | 2/2019 |

* cited by examiner

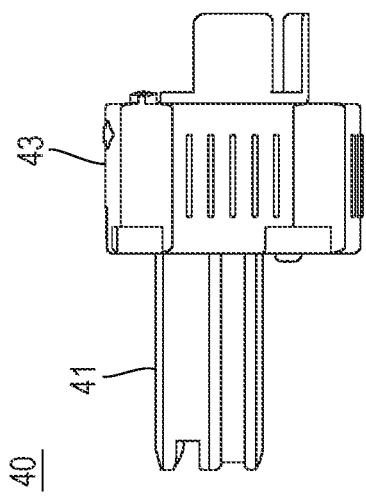
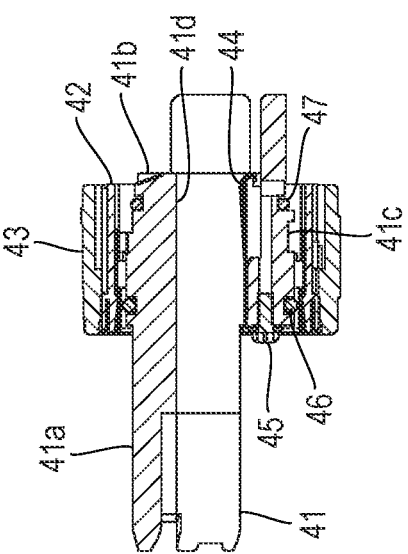
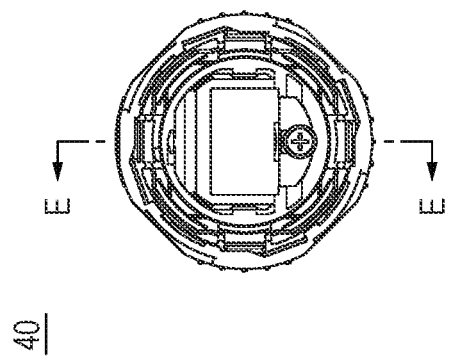
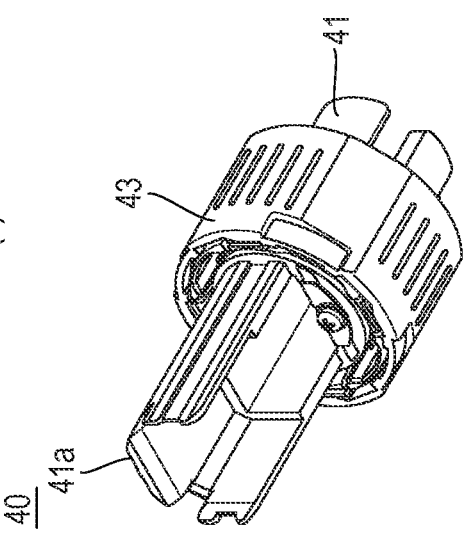

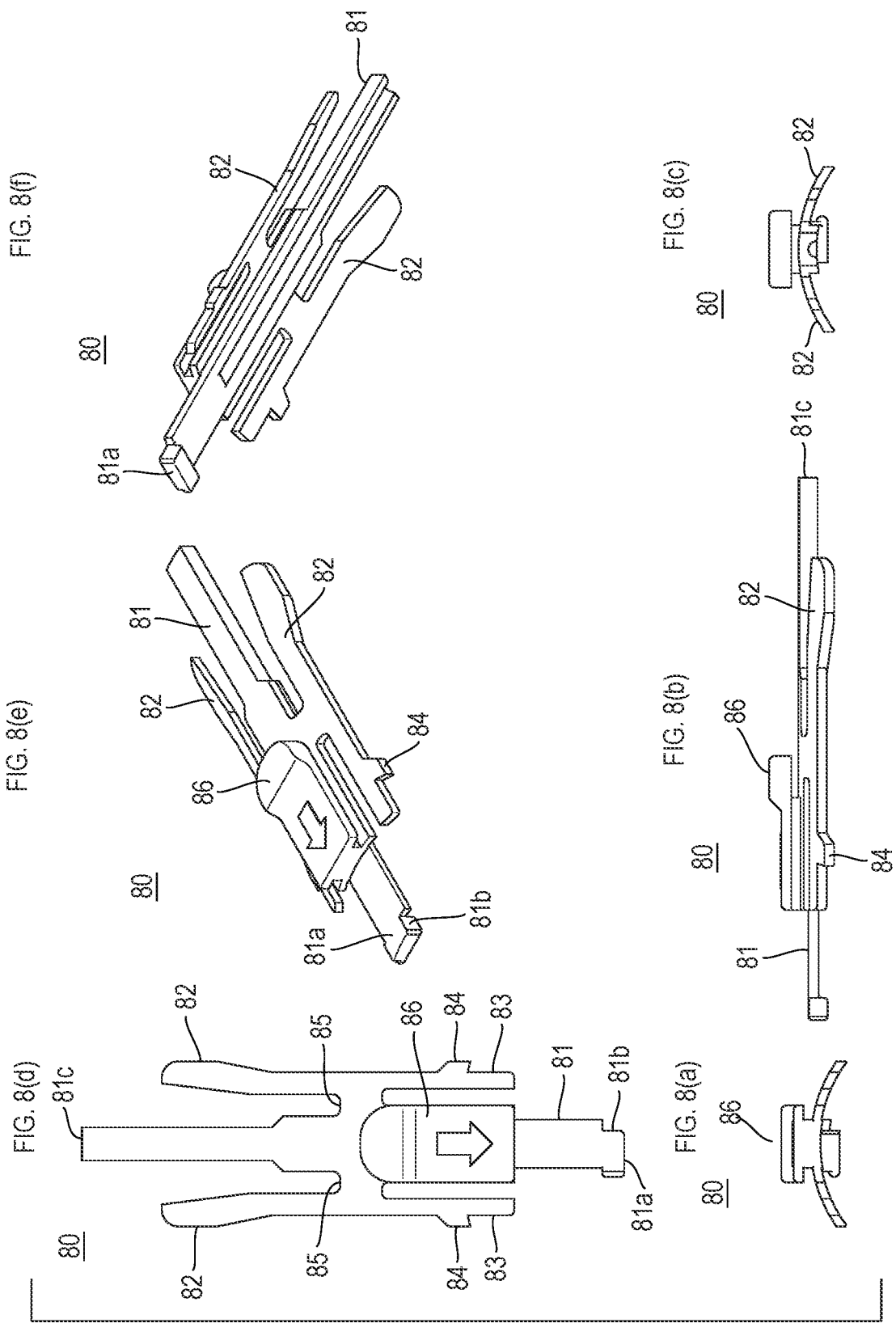

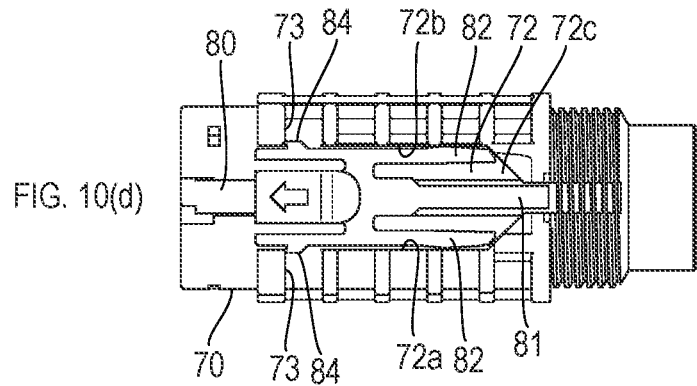
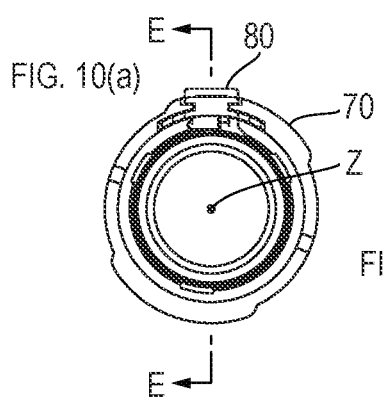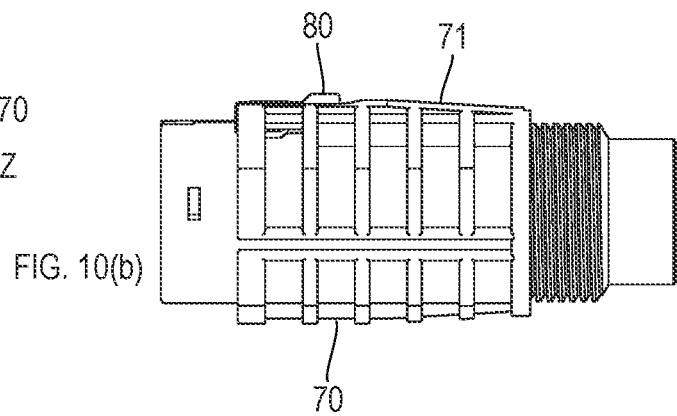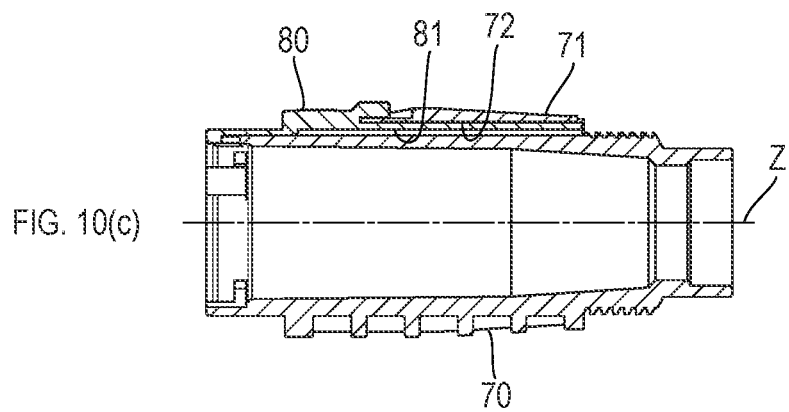

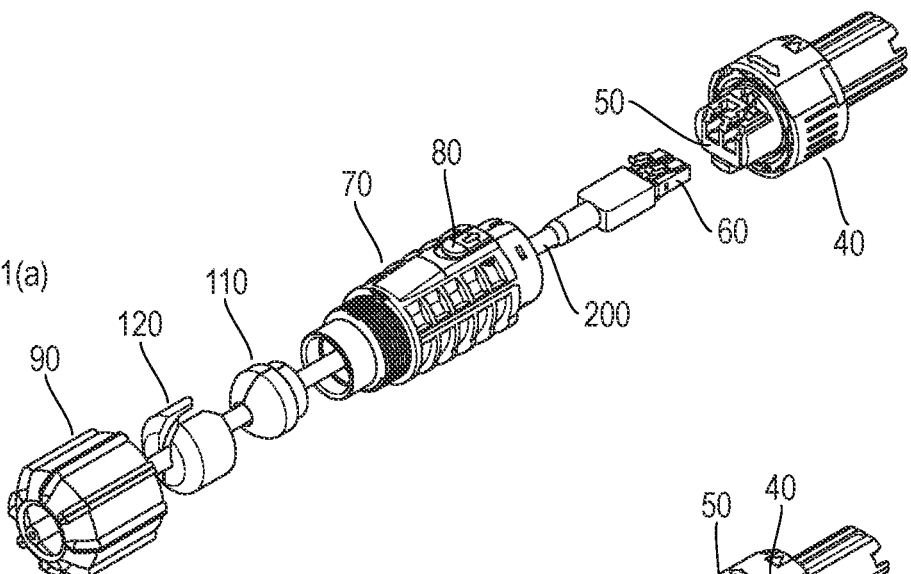
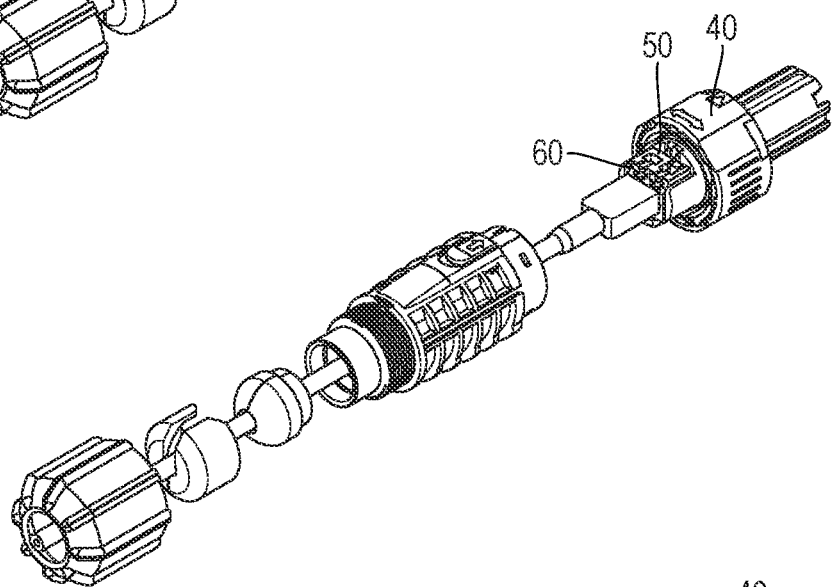
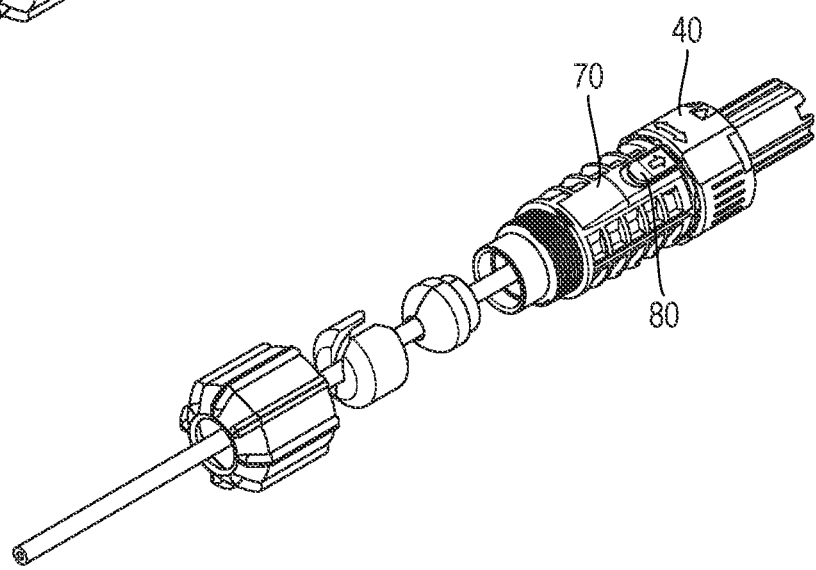
FIG. 11(a)
FIG. 11(b)
FIG. 11(c)

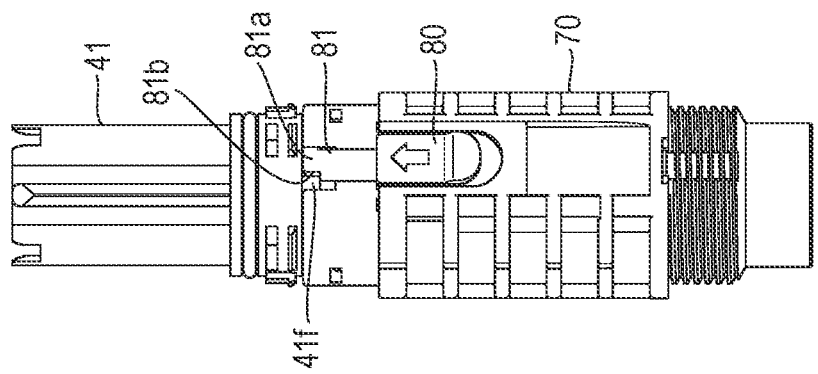
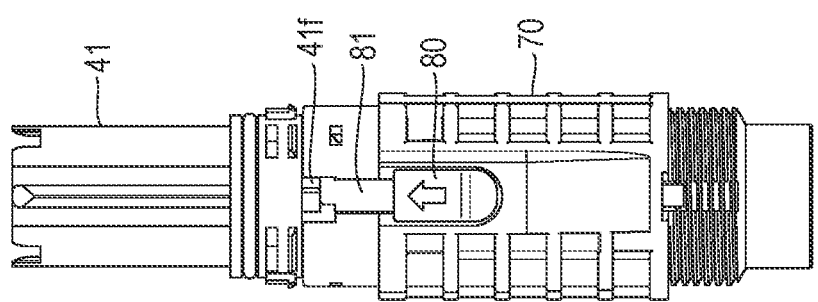
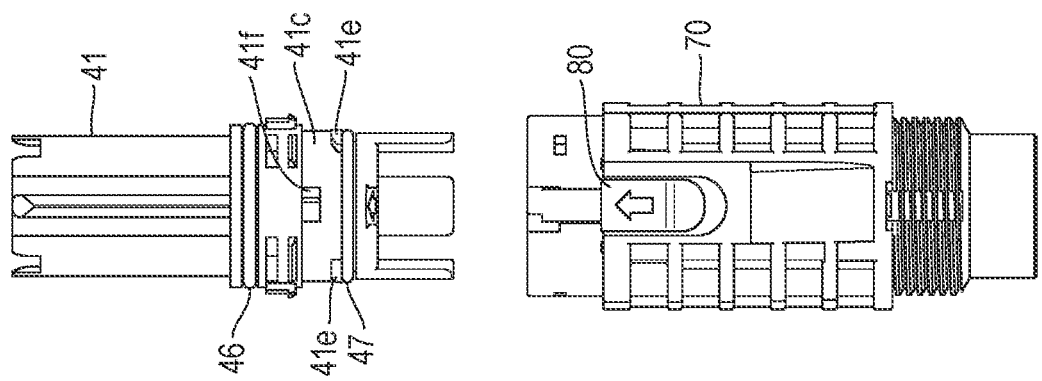

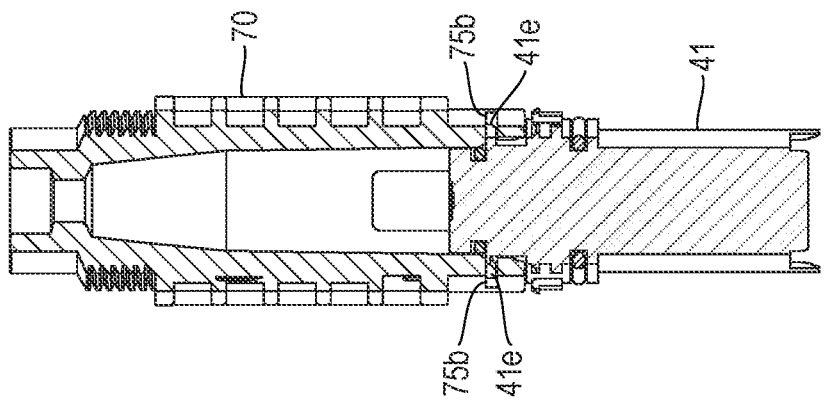
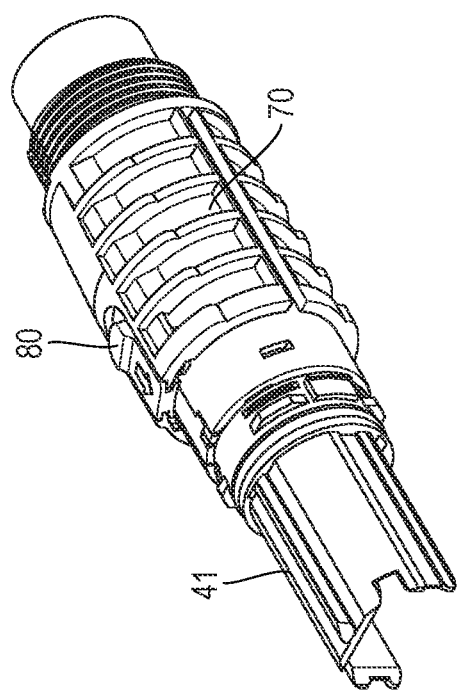
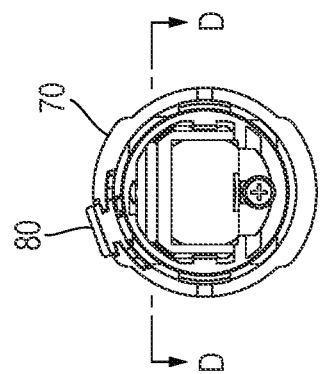

PLUG CONNECTOR

TECHNICAL FIELD

An embodiment of the present invention relates to a plug connector incorporating an optical connector attached to an optical cable and a photoelectric conversion module that is connected with the optical connector.

BACKGROUND ART

FIGS. 1 and 2 illustrate a plug connector that is described in Japanese Patent Application Laid Open No. 2019-32432 as a related art of the above-mentioned type of plug connector. This plug connector includes a plug connector main body 10 and a stopper 15. FIG. 1 illustrates a state in which the stopper 15 is detached from the plug connector main body 10.

FIG. 2 illustrates a state in which the plug connector main body 10 is separated into a front portion 11 and a rear portion 12. In the front portion 11, 21 denotes an optical module and 22 denotes a front holder. Further, 23 denotes an operation portion. In the rear portion 12, 25 denotes an optical connector and 26 denotes a rear holder. Further, 27 denotes a coupling nut and 28 denotes a rear cap.

The optical connector 25 is attached to an end of an optical fiber cable 30 and is held by the rear holder 26. The optical module 21 is a small form-factor pluggable (SFP) module and includes a photoelectric conversion portion and an electrical connector. The optical module 21 is held by the front holder 22.

The optical module 21 is connected with the optical connector 25. The front portion 11 and the rear portion 12 are fastened to each other by screwing the coupling nut 27 onto a male screw portion 22a, which is formed on an outer circumference of a rear portion of the front holder 22. The stopper 15 is attached to the rear portion 12 of the plug connector main body 10, regulating backward movement of the coupling nut 27.

SUMMARY OF THE INVENTION

In a plug connector incorporating a photoelectric conversion module as the above-mentioned plug connector, when a functional change (functional improvement) is required to accommodate, for example, a change in communication standards, the functional change can be achieved by replacing the photoelectric conversion module. That is, components other than the photoelectric conversion module can be used without change.

Further, when a plug connector is to be connected with a receptacle connector that is provided on a casing of a base station, a photoelectric conversion module can be relatively easily replaced in a case of malfunction of the photoelectric conversion module, for example, compared to a photoelectric conversion module which is provided on a casing of a base station.

Considering workability in replacement of photoelectric conversion modules from this perspective, a conventional plug connector having the configuration illustrated in FIGS. 1 and 2 requires a work of detaching the stopper 15 attached to the rear portion 12 of the plug connector main body 10 and a work of turning the coupling nut 27 to release threaded engagement with the front holder 22. The work of detaching the stopper 15 which is elastically deformed and fitted is especially hard to be performed. Thus, the workability has not been good.

An object of the embodiment of the present invention is to provide a plug connector that is configured so that a replacement work can be more easily performed in replacement of a photoelectric conversion module compared to related art.

According to an embodiment of the present invention, in a plug connector that incorporates an optical connector, which is attached to an optical cable, and a photoelectric conversion module, which is connected with the optical connector, the optical connector is accommodated in an end bell having a cylindrical shape and the photoelectric conversion module is accommodated in a barrel, which is inserted into a mating receptacle connector. When an axial center of the end bell is assumed to be a Z axis, a Z-axis-direction locking mechanism and a rotation locking mechanism around the Z axis are provided on a cylindrical surface on a rear end side of the barrel and the end bell a front end side of which is fitted to the cylindrical surface. The Z-axis-direction locking mechanism is composed of a first convex portion, which is provided on one of the cylindrical surface and an inner circumferential surface on the front end side of the end bell, and a concave portion, which is provided on the other. The concave portion is composed of a Z-axis-direction groove, which guides the first convex portion, and a circumferential-direction groove, which is formed to be extended from an inner end of the Z-axis-direction groove in a circumferential direction. The rotation locking mechanism is composed of a second convex portion, which is provided on the cylindrical surface, and a locking member, which is attached to the end bell in a manner to be movable in a Z-axis direction. The locking member includes a main trunk portion, a pair of spring pieces, a pair of extended pieces, and claws. The main trunk portion elongates in the Z-axis direction. The pair of spring pieces is formed in an extended manner on respective sides of the main trunk portion so that a distance between the spring pieces increases toward a rear side in the Z-axis direction to form a V shape. The pair of extended pieces is formed to be extended frontward in the Z-axis direction on respective sides of the main trunk portion and to have front ends positioned on a rear side in the Z-axis direction compared to a front end of the main trunk portion. The claws are formed on the pair of extended pieces in a manner to protrude outward from each other. The pair of spring pieces has an elastic restoring force against an external force that reduces a distance between the spring pieces. The locking member is attached to the end bell in a manner such that the claws are caught by locking portions, which are formed on the end bell, to prevent the locking member from coming off frontward in the Z-axis direction and the pair of spring pieces is sandwiched between side walls of a concave groove from respective outer sides, the concave groove being formed on a circumferential wall of the end bell to be extended in the Z-axis direction and being formed to have a rear end side narrowed toward a rear side in the Z-axis direction. When the end bell is fitted to the barrel at a predetermined position around the Z axis, the first convex portion is inserted into the Z-axis-direction groove and the front end of the main trunk portion is abutted on the second convex portion to push the locking member backward in the Z-axis direction, and a state in which ends of the pair of spring pieces are positioned in a narrow portion of the concave groove is accordingly generated. When the end bell is rotated from the state to one direction around the Z axis by a predetermined angle, the first convex portion is positioned on the circumferential-direction groove and the barrel and the end bell are locked in the Z-axis direction, and the front end of the main trunk portion is disengaged from the second convex portion and the locking member is urged by the elastic restoring force of the pair of spring pieces so as to move frontward in the Z-axis direction, and accordingly rotation of the end bell in a reverse direction to the one direction is blocked when the main trunk portion is abutted on the second convex portion in a rotation direction around the Z axis, and a fitting completion state is thus generated. The end bell can be detached from the barrel in a manner such that the end bell is rotated in the reverse direction to the one direction so as to locate the end bell on the predetermined position while operating the locking member to move the locking member backward against an urging force and releasing abutting between the main trunk portion and the second convex portion in the rotation direction in the fitting completion state.

Effects of the Invention

According to the plug connector of the embodiment of the present invention, coupling between the barrel, which accommodates the photoelectric conversion module, and the end bell, which is coupled with the barrel and serves as an outer shell of the plug connector, can be easily released (lock release), and a replacement work can be easily performed in replacement of a photoelectric conversion module.

BRIEF DESCRIPTION OF THE DRAWINGS

FIG. 6(a) is a front elevational view illustrating a barrel assembly of FIG. 4, FIG. 6(b) is a side view of the same, FIG. 6(c) is a perspective view of the same, and FIG. 6(d) is a sectional view of the same taken along an E-E line of FIG. 6(a).

FIG. 8(a) is a front elevational view illustrating a locking member of FIG. 4, FIG. 8(b) is a side view of the same, FIG. 8(c) is a rear view of the same, FIG. 8(d) is a plan view of the same, FIG. 8(e) is an upper perspective view of the same, and FIG. 8(f) is a lower perspective view of the same.

FIG. 10(a) is a front elevational view illustrating a state in which the locking member is attached to the end bell, FIG. 10(b) is a side view of the same, FIG. 10(c) is a sectional view of the same taken along an E-E line of FIG. 10(a), and FIG. 10(d) is a plan view including partially-omitted illustration of the end bell to which the locking member is attached.

FIG. 11(a) is a drawing for explaining assembly of a plug connector, FIG. 11(b) is a drawing for explaining the assembly of the plug connector, and FIG. 11(c) is a drawing for explaining the assembly of the plug connector.

FIG. 14(a) is a plan view corresponding to the perspective view of FIG. 13(a), FIG. 14(b) is a plan view corresponding to the perspective view of FIG. 13(b), and FIG. 14(c) is a plan view corresponding to the perspective view of FIG. 13(c).

FIG. 15(a) is a perspective view corresponding to FIG. 13(c), FIG. 15(b) is a plan view of the same, and FIG. 15(c) is a sectional view of the same taken along a D-D line of FIG. 15(b).

DETAILED DESCRIPTION OF THE EMBODIMENTS

An embodiment of the present invention will be described based on an example with reference to the accompanying drawings.

Figure 1:
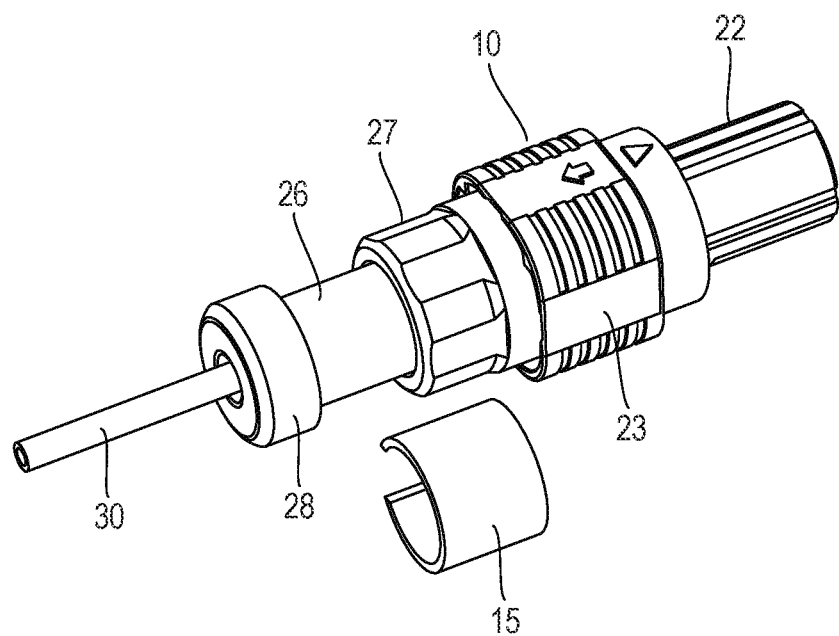
FIG. 1 illustrates a conventional plug connector with a stopper detached.
Figure 2:
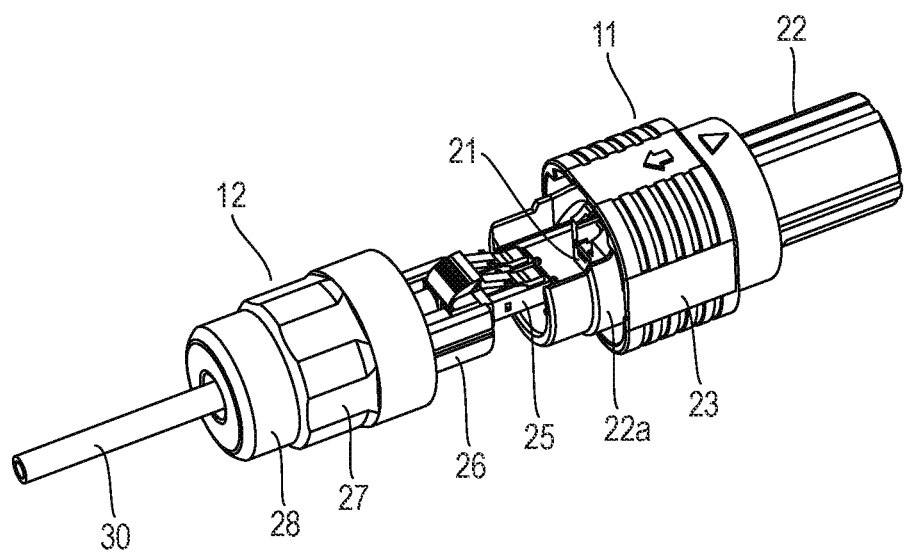
FIG. 2 illustrates a state in which a plug connector main body of FIG. 1 is separated into a front portion and a rear portion.
Figure 3A:
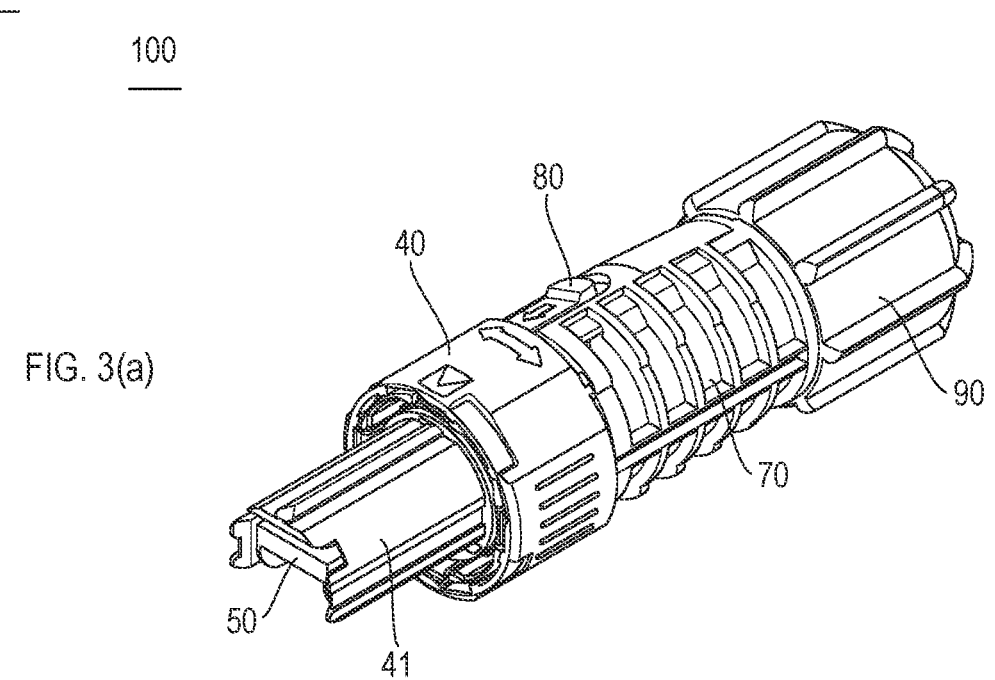
FIG. 3(a) is a perspective view illustrating an example of a plug connector according to an embodiment of the present invention.
Figure 3B:
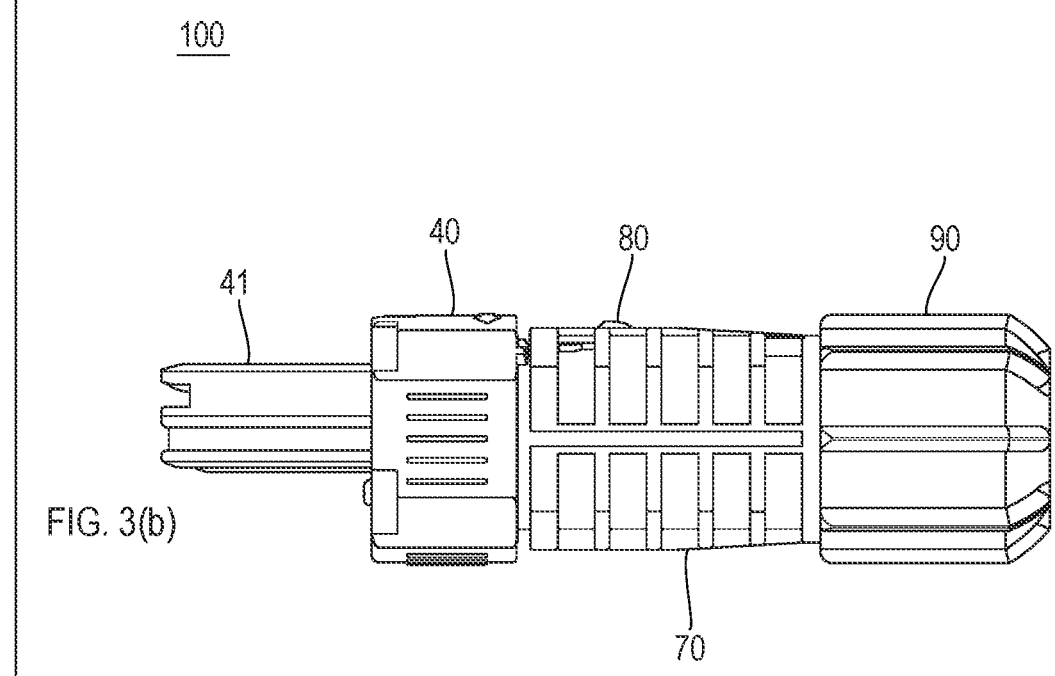
FIG. 3(b) is a side view of the same.
Figure 4:
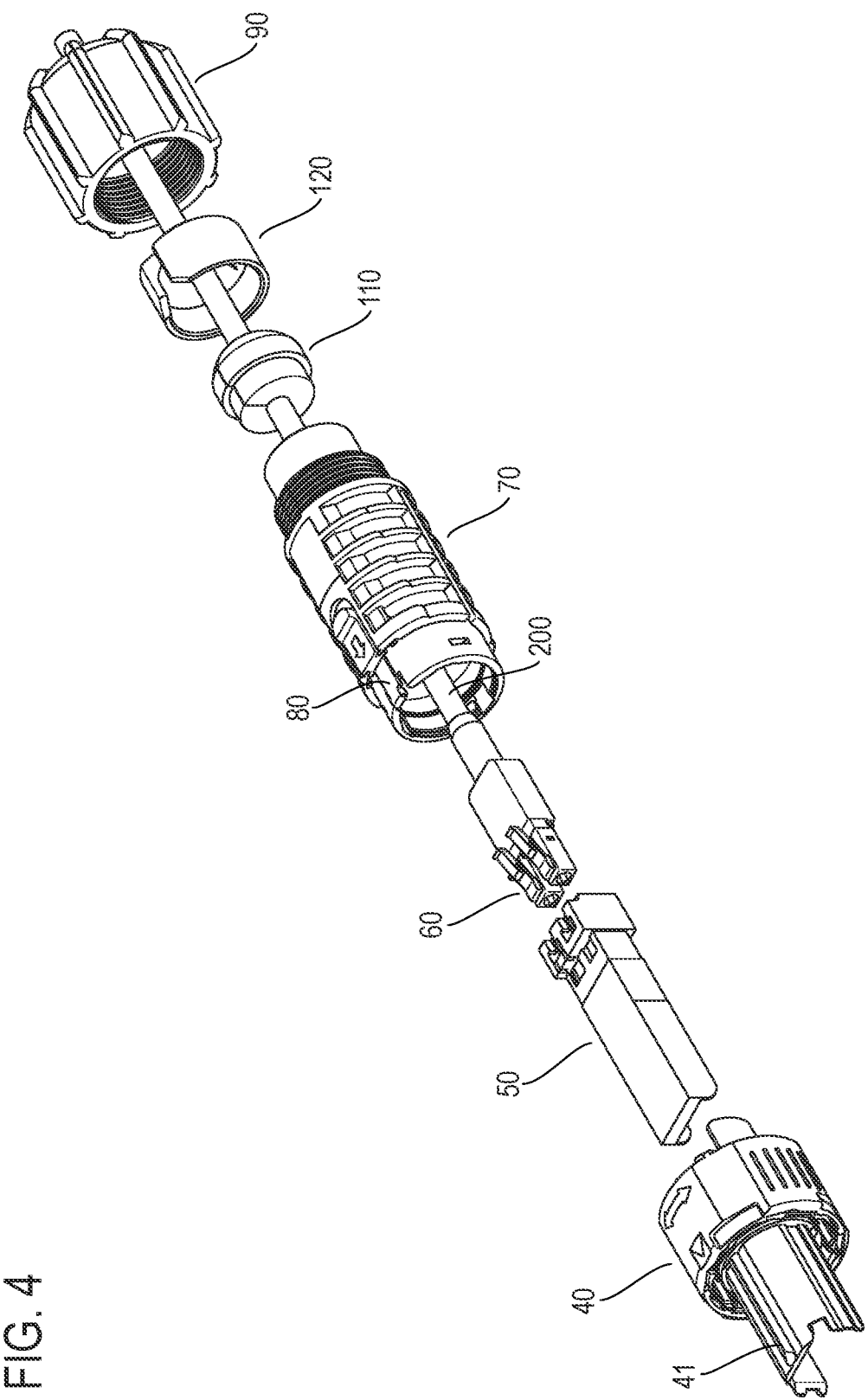
FIG. 4 is an exploded frontward perspective view of the plug connector illustrated in FIG. 3.
Figure 5:
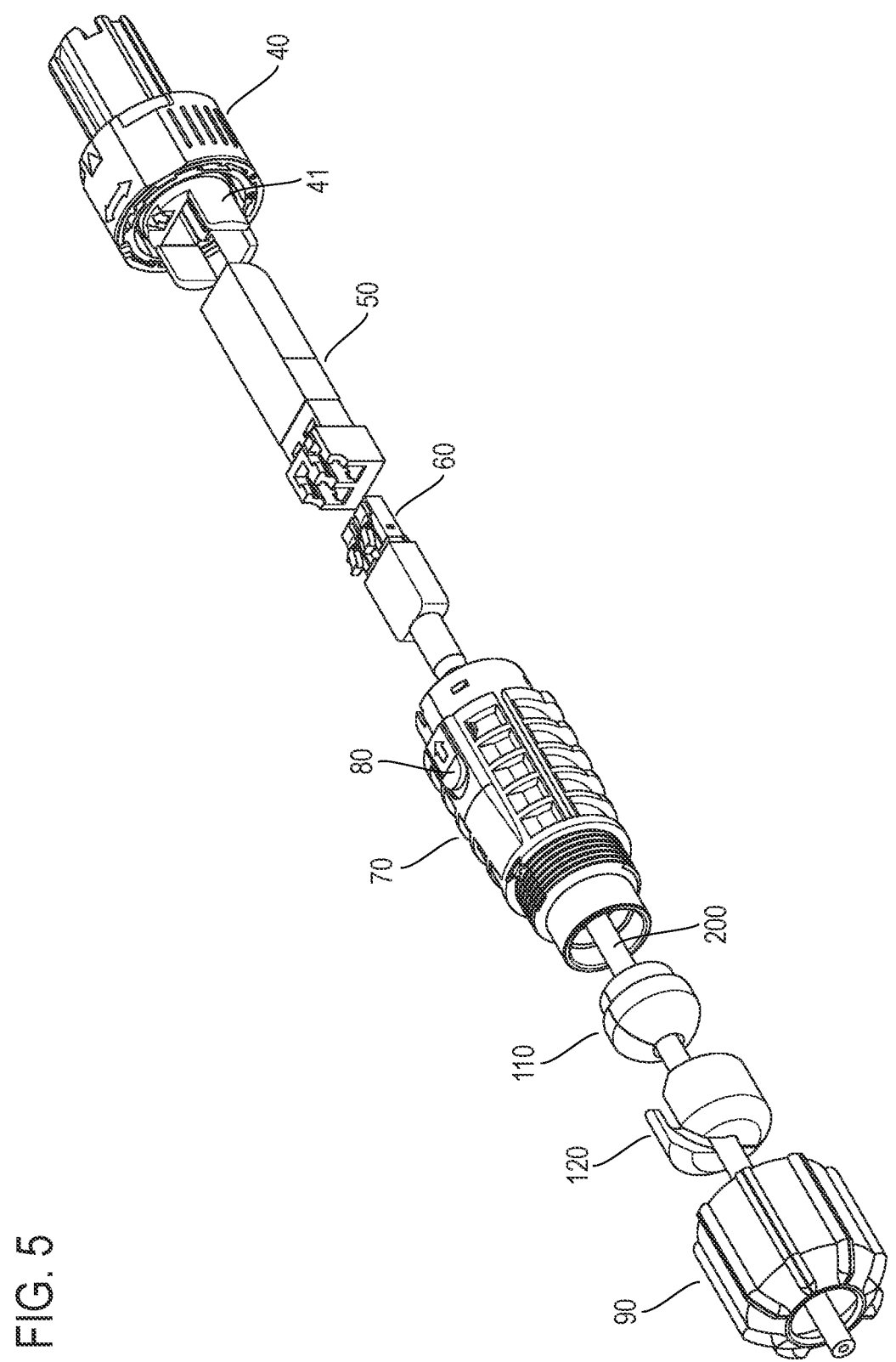
FIG. 5 is an exploded backward perspective view of the plug connector illustrated in FIG. 3.
Figure 7A:
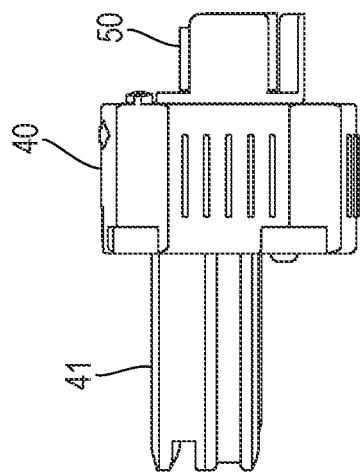
FIG. 7(a) is a front elevational view illustrating a state in which a photoelectric conversion module is attached to the barrel assembly illustrated in FIG. 6.
Figure 7B:
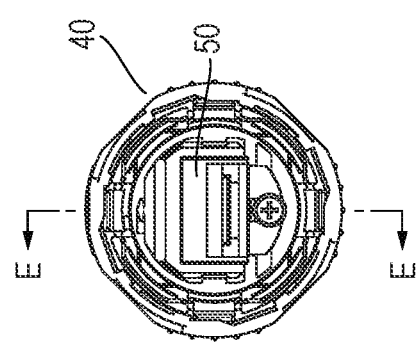
FIG. 7(b) is a side view of the same.
Figure 7C:
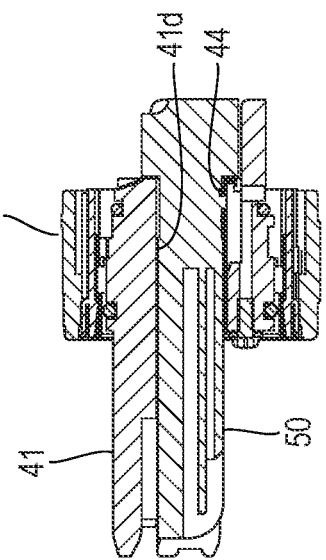
FIG. 7(c) is a perspective view of the same.
Figure 7D:
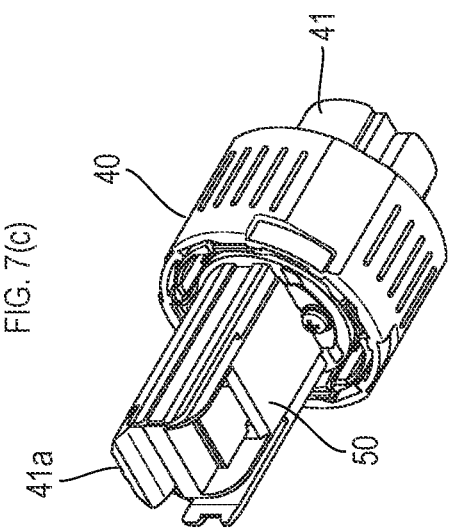
FIG. 7(d) is a sectional view of the same taken along an E-E line of FIG. 7(a).
Figure 9A:
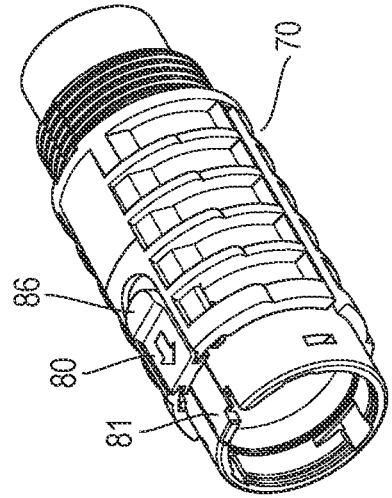
FIG. 9(a) is a drawing for explaining attachment of the locking member to an end bell.
Figure 9B:
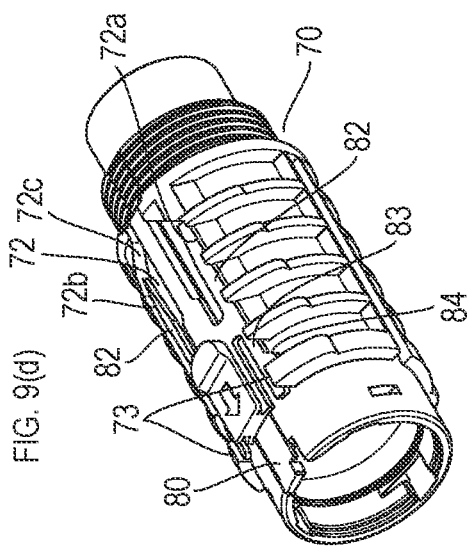
FIG. 9(b) is a perspective view illustrating a state in which the locking member is attached to the end bell.
Figure 9C:
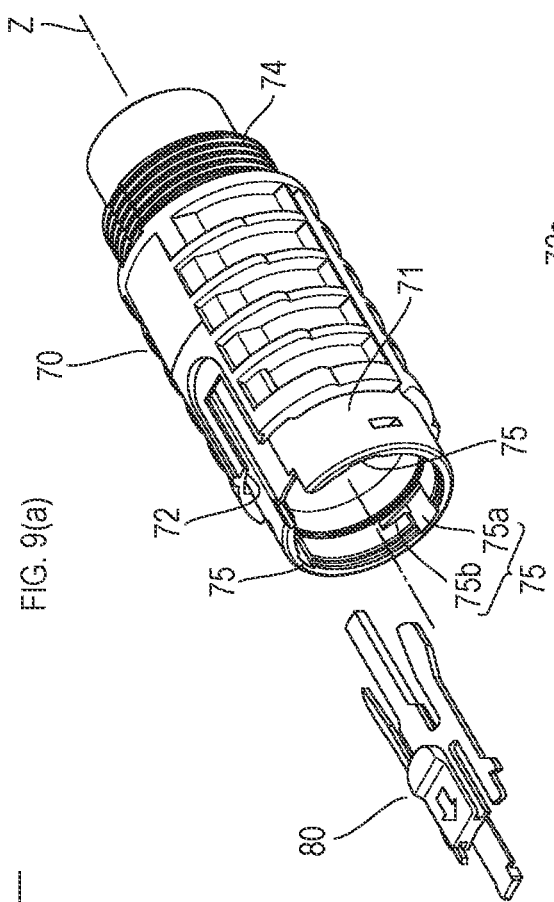
FIG. 9(c) is a drawing including partially-omitted illustration of the end bell of FIG. 9(a)
Figure 9D:
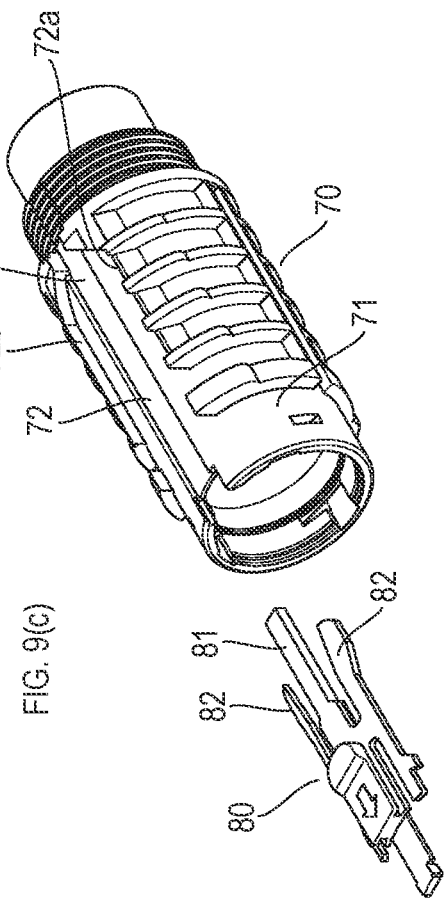
FIG. 9(d) is a drawing including partially-omitted illustration of the end bell of FIG. 9(b).

FIG. 3 illustrates an example of a plug connector according to the embodiment of the present invention. FIGS. 4 and 5 illustrate a plug connector 100 of FIG. 3 in a manner to explode the plug connector 100 into components. Here, FIG. 3 omits illustration of an optical cable to which the plug connector 100 is attached.

The plug connector 100 is configured to include a barrel assembly 40, a photoelectric conversion module 50, an optical connector 60, an end bell 70, a locking member 80, a ground nut 90, a bushing 110, and a ring 120 as illustrated in FIGS. 4 and 5 in this example. In FIGS. 4 and 5, 200 denotes an optical cable. The optical connector 60 is attached to a terminal of the optical cable 200. The optical connector 60 is an LC2-core connector in this example.

The barrel assembly 40 is a portion that is fitted to and connected with a mating receptacle connector. As illustrated in FIG. 6, the barrel assembly 40 includes a barrel 41, a lock ring 42, a slider 43, a plate spring 44, and a screw 45. A front end side of the barrel 41 is an insertion portion 41a that is inserted into a mating receptacle connector, and the insertion portion 41a has a C-shape section.

The lock ring 42 and the slider 43 are attached around a cylindrical surface 41c which is formed by an outer circumferential surface of an attachment portion 41b on a rear end side of the barrel 41. An attachment hole 41d is formed to penetrate through the attachment portion 41b in a front and rear direction. The attachment hole 41*d* communicates with an internal space of the C shape of the insertion portion 41*a*. The plate spring 44 is arranged in the attachment hole 41*d* in a manner such that one end of the plate spring 44 is fixed on the barrel 41 by the screw 45. Here, 46 and 47 in FIG. 6(*d*) denote O rings.

The photoelectric conversion module 50 is an SFP module in this example. The photoelectric conversion module 50 is inserted into the attachment hole 41*d* of the barrel 41 so as to be accommodated and held by the barrel 41 as illustrated in FIG. 7. The plate spring 44 that is arranged in the attachment hole 41*d* of the barrel 41 functions as a fixing means of the photoelectric conversion module 50.

The end bell 70, which serves as an outer shell of the plug connector 100, has a cylindrical shape, and the locking member 80 is attached to the end bell 70 as illustrated in FIGS. 4 and 5. In the following description, an axial center of the end bell 70 is assumed to be a Z axis (see FIGS. 9 and 10 described later). The locking member 80 is attached to the end bell 70 in a manner to be movable in the Z-axis direction.

FIG. 8 illustrates a detailed shape of the locking member 80. The locking member 80 is made of resin to be formed in one piece in this example. The locking member 80 includes a main trunk portion 81, a pair of spring pieces 82, a pair of extended pieces 83, and claws 84. The main trunk portion 81 elongates in the Z-axis direction. The spring pieces 82 are formed to be extended on respective sides of the main trunk portion 81 in the width direction so that a distance between the spring pieces 82 increases toward the rear side (backward in the Z-axis direction) to form a V shape. The extended pieces 83 are formed to be extended frontward (frontward in the Z-axis direction) on respective sides of the main trunk portion 81 in the width direction, and front ends of the extended pieces 83 are positioned on the rear side compared to the front end of the main trunk portion 81 (backward in the Z-axis direction). The claws 84 are formed on the pair of extended pieces 83 in a manner to protrude outward from each other.

The pair of spring pieces 82 has an elastic restoring force against an external force that reduces their mutual distance. Each base end of the pair of spring pieces 82 and each base end of the pair of extended pieces 83 are coupled with and supported by a pair of arm portions 85, which are formed from the main trunk portion 81 in a manner to protrude mutually outward in this example. On an upper middle portion of the main trunk portion 81 in the elongating direction, an operation portion 86 is provided so as to form a two-stage structure with the main trunk portion 81. In this example, a front end portion 81*a* of the main trunk portion 81 is shaped to have a step shift in the width direction, which forms a cutout 81*b* at the front end. Further, the front end portion 81*a* of the main trunk portion 81 is thicker than a portion following the front end portion 81*a*.

FIGS. 9(*a*) and 9(*b*) illustrate a state in which the locking member 80 is attached to the end bell 70. FIGS. 9(*c*) and 9(*d*) are drawings corresponding to FIGS. 9(*a*) and 9(*b*) respectively, and provide partially-omitted illustration of the end bell 70 so as to describe details of the attachment.

A concave groove 72 is formed on a circumferential wall 71 of the end bell 70 in a manner to be extended in a front and rear direction (Z-axis direction), as illustrated in FIG. 9(*c*) providing the partially-omitted illustration of the circumferential wall 71. That is, part of the circumferential wall 71 of the end bell 70 has the two-stage structure with the concave groove 72 interposed, the concave groove 72 forming a narrow gap. The rear end side of the concave groove 72 in the Z-axis direction is formed to be narrowed toward the rear side.

The main trunk portion 81 and the pair of spring pieces 82 are inserted from the front end of the end bell 70 into the concave groove 72, and the locking member 80 is thus attached. Accordingly, the pair of spring pieces 82 are sandwiched between side walls 72*a* and 72*b* of the concave groove 72 from respective outer sides, as illustrated in FIG. 9(*d*).

The pair of spring pieces 82 has the elastic restoring force against an external force that reduces the mutual distance, as mentioned above. That is, when the ends of the pair of spring pieces 82 are pressed up to the position of a narrow portion 72*c* of the concave groove 72 in the attachment of the locking member 80 to the end bell 70, the elastic restoring force of the pair of spring pieces 82 urges the locking member 80 frontward (frontward in the Z-axis direction). However, the claws 84, which are formed on the pair of extended pieces 83 in a protruding manner, are caught by locking portions 73 formed on the end bell 70, thereby preventing the locking member 80 from coming off frontward in the Z-axis direction. In the state in which the locking member 80 is attached to the end bell 70, the front end side of the main trunk portion 81 and the operation portion 86 are exposed as illustrated in FIG. 9(*b*).

FIG. 10 illustrates a state in which the locking member 80 is retained and attached to the end bell 70 as described above. FIG. 10(*d*) provides partially-omitted illustration of the circumferential wall 71 of the end bell 70 as is the case with FIG. 9(*d*), and illustrates a state in which a pair of claws 84 are caught by the locking portions 73 of the end bell 70 to prevent the locking member 80 from coming off. Further, FIG. 10(*c*) illustrates a state in which part of the circumferential wall 71 of the end bell 70 has a two-stage structure with the concave groove 72, into which the locking member 80 is inserted, sandwiched.

The attachment of the photoelectric conversion module 50 to the barrel assembly 40 and the attachment of the locking member 80 to the end bell 70 have been described above. Hereinafter, a method for assembling the entire plug connector 100 will be described.

Figure 12A:
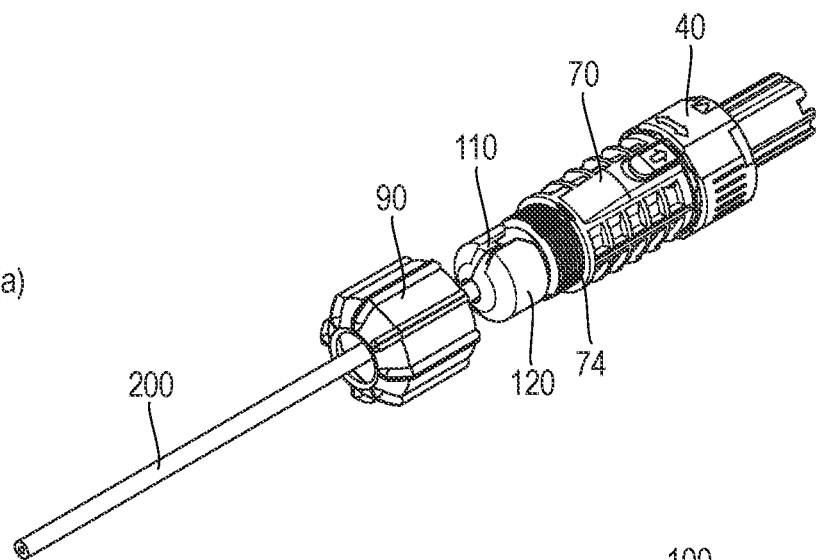
FIG. 12(a) is a drawing for explaining the assembly of the plug connector.

FIGS. 11(*a*) to 11(*c*) and FIGS. 12(*a*) and 12(*b*) show an outline of the method for assembling the plug connector 100 in order.

1) The ground nut 90, the ring 120, the bushing 110, and the end bell 70 to which the locking member 80 is attached are allowed to penetrate through the optical cable 200, to which the optical connector 60 is attached (FIG. 11(*a*)).
2) The optical connector 60 is connected to the photoelectric conversion module 50, which is attached to the barrel assembly 40 (FIG. 11(*b*)).
3) The end bell 70 is attached to the barrel assembly 40. The optical connector 60 is accordingly accommodated in the end bell 70 (FIG. 11(*c*)).
4) The bushing 110 and the ring 120 are incorporated into the rear end side of the end bell 70 (FIG. 12(*a*)).
5) The ground nut 90 is screwed into a male screw portion 74, which is provided on the rear end side of the end bell 70 (FIG. 12(*b*)).

The assembly of the plug connector 100 and the attachment to the optical cable 200 are thus completed.

Figure 13A:
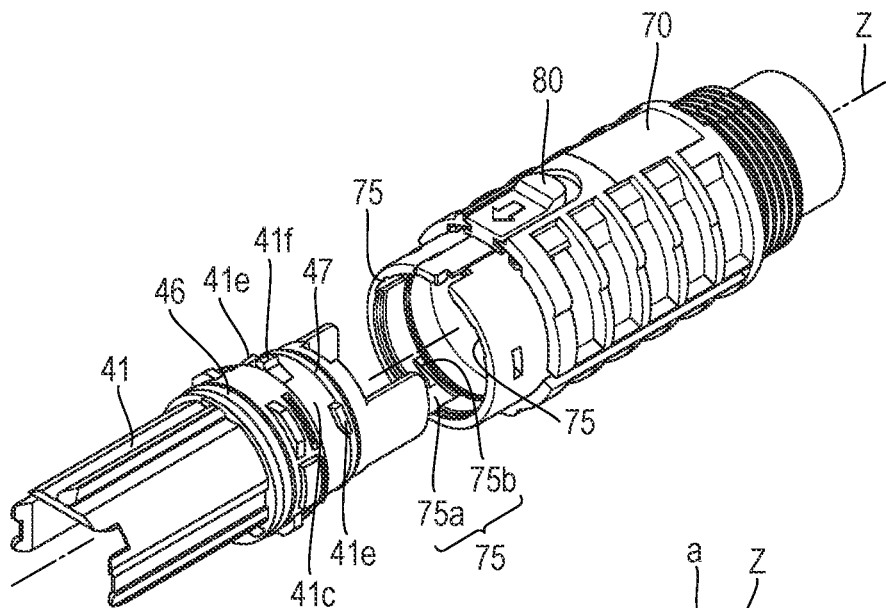
FIG. 13(a) is a drawing for explaining attachment of the end bell, to which the locking member is attached, to the barrel.

In the attachment of the end bell 70 to the barrel assembly 40 described in 3) above, the front end side of the end bell 70 is fitted to the cylindrical surface 41*c* on the rear end side of the barrel 41 to generate locking in the Z-axis direction and locking of rotation around the Z axis. The locking by a Z-axis-direction locking mechanism and locking by a rotation locking mechanism around the Z axis will be described below with reference to FIGS. 13 to 15. However, FIGS. 13 to 15 only show the barrel 41, to which the O rings 46 and 47 are attached, and the end bell 70, to which the locking member 80 is attached, and omit illustration of other components.

The Z-axis-direction locking mechanism is composed of a first convex portion, which is provided on one of the cylindrical surface 41c of the barrel 41 and the inner circumferential surface on the front end side of the end bell 70, and a concave portion, which is provided on the other. The concave portion is composed of a Z-axis-direction groove guiding the first convex portion and a circumferential-direction groove which is formed to be extended from an inner end of the Z-axis direction-groove in the circumferential direction. Although partially hidden and not visible in FIGS. 13(a) and 14(a), first convex portions 41e are provided at three locations at equal angular intervals in the circumferential direction on the cylindrical surface 41c of the barrel 41, and concave portions 75 are provided at three locations on the inner circumferential surface on the front end side of the end bell 70 corresponding to the first convex portions 41e, in this example. 75a denotes a Z-axis-direction groove of the concave portion 75 and 75b denotes a circumferential-direction groove of the concave portion 75. However, the embodiment of the present invention is not limited to this example, and may employ a configuration in which the first convex portions are provided on the inner circumferential surface on the front end side of the end bell 70 and the concave portion is provided on the cylindrical surface 41c of the barrel 41 and which performs the same function.

The rotation locking mechanism about the Z axis is composed of a second convex portion 41f and the locking member 80, as illustrated in FIGS. 13 and 14. The second convex portion 41f is provided on the cylindrical surface 41c of the barrel 41, and the locking member 80 is attached to the end bell 70 in a manner to be movable in the Z-axis direction as described above.

Figure 13B:
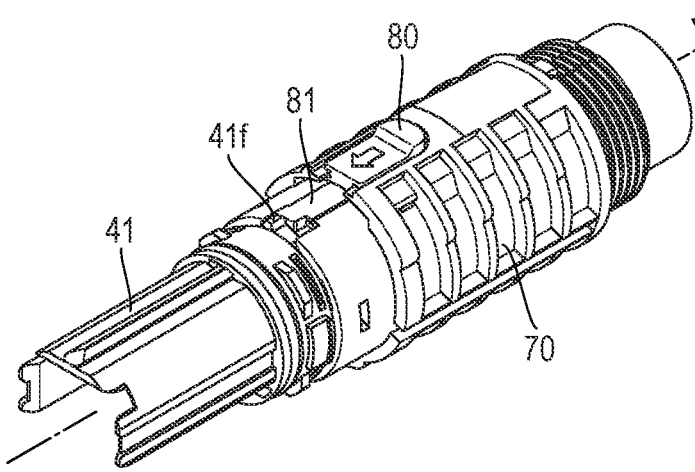
FIG. 13(b) is a drawing for explaining the attachment of the end bell, to which the locking member is attached, to the barrel.

When the end bell 70 is fitted to the barrel 41 at a predetermined position around the Z axis, the first convex portion 41e, which is provided on the cylindrical surface 41c of the barrel 41, is inserted into the Z-axis-direction groove 75a of the concave portion 75, which is provided on the inner circumferential surface of the end bell 70. The front end of the main trunk portion 81 is abutted on the second convex portion 41f, which is provided on the cylindrical surface 41c, thereby pushing the locking member 80 backward in the Z-axis direction as illustrated in FIGS. 13(b) and 14(b). This generates a state in which the ends of the pair of spring pieces 82 of the locking member 80 are positioned in the narrow portion 72c of the concave groove 72 of the end bell 70.

When the end bell 70 is rotated from this state to one direction around the Z axis, which is illustrated by an arrow a in FIG. 13(b), by a predetermined angle, the first convex portion 41e moves from the Z-axis-direction groove 75a of the concave portion 75 to be positioned on the circumferential-direction groove 75b. Accordingly, the barrel 41 and the end bell 70 are locked in the Z-axis direction. FIG. 15(c) illustrates a state in which the first convex portion 41e is positioned in the circumferential-direction groove 75b and the barrel 41 and the end bell 70 are thus locked in the Z-axis direction.

Figure 13C:
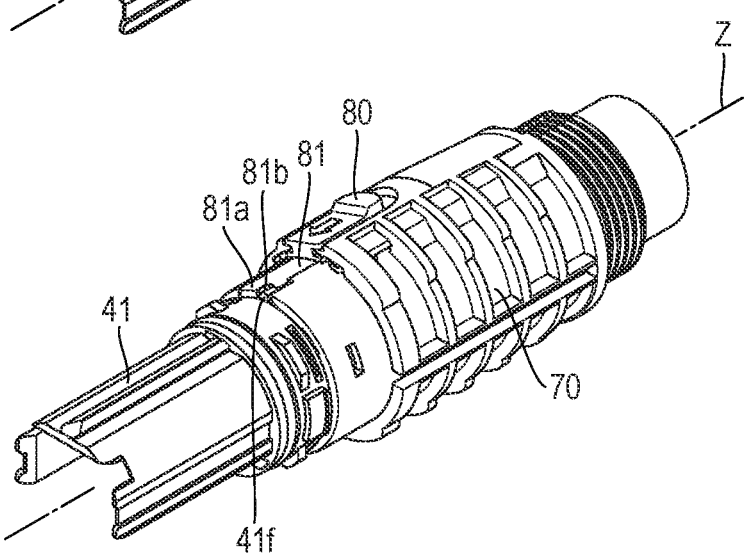
FIG. 13(c) is a drawing illustrating a state in which the attachment of the end bell, to which the locking member is attached, to the barrel is completed.
Figure 16A:
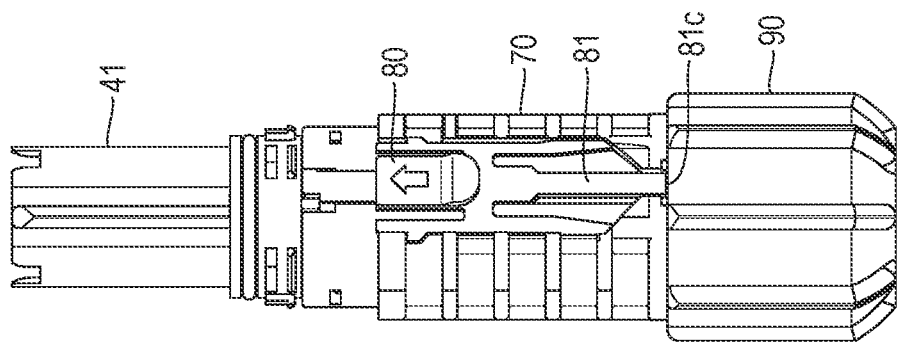
FIG. 16(a) is a drawing corresponding to FIG. 14(c)
Figure 16B:
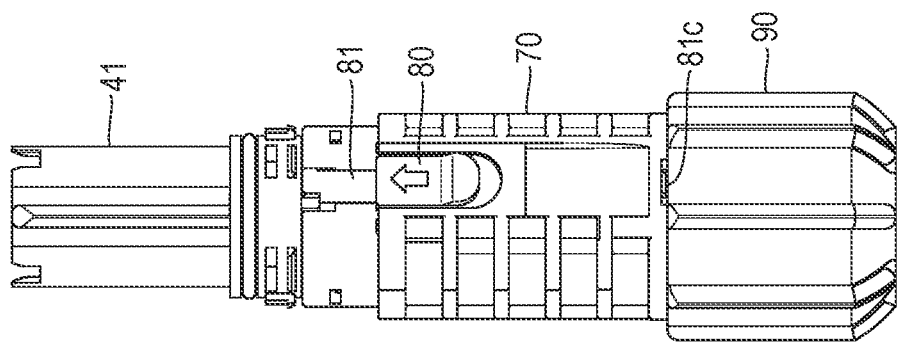
FIG. 16(b) is a drawing in which the locking member of FIG. 16(a) is moved backward.
Figure 16C:
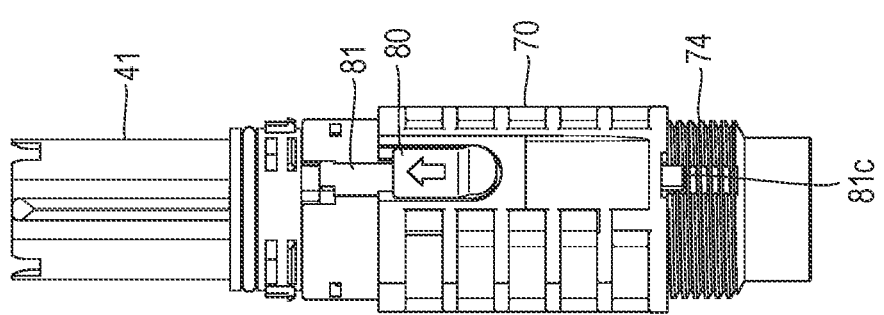
FIG. 16(c) is a drawing in which a ground nut is added to FIG. 16(a)
Figure 16D:
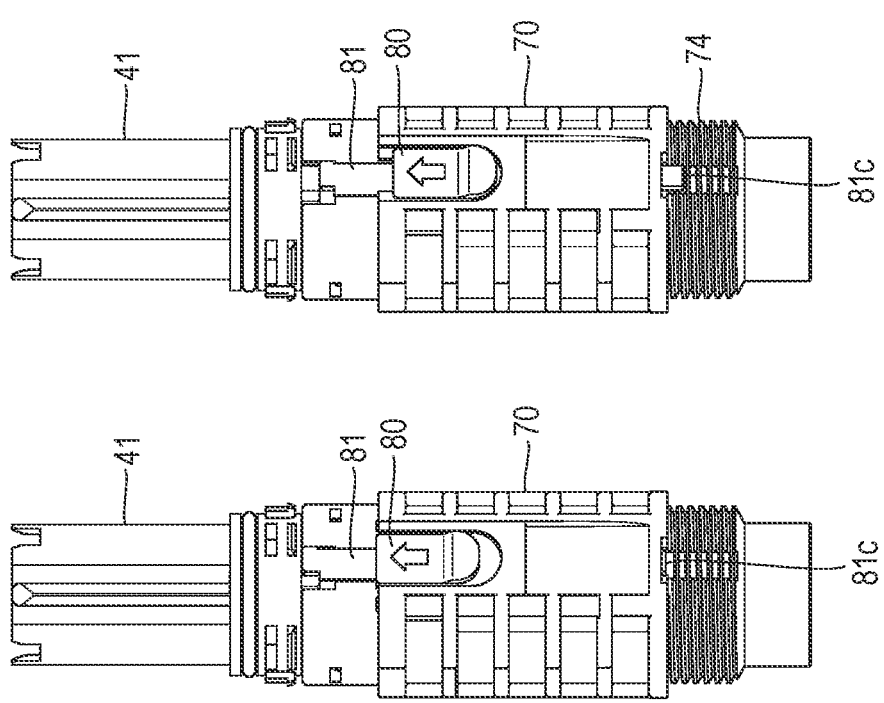
FIG. 16(d) is a drawing for explaining a state in which a backward moving operation of the locking member is blocked by the ground nut.

Further, by rotating the end bell 70, the front end of the main trunk portion 81 of the locking member 80 is disengaged from the second convex portion 41f and the abutting on the second convex portion 41f is released. Thus, the locking member 80 is urged by the elastic restoring force of the pair of spring pieces 82 so as to move frontward in the Z-axis direction as illustrated in FIGS. 13(c) and 14(c). Accordingly, the second convex portion 41f is positioned in the cutout 81b, which is on the front end of the main trunk portion 81, in this example, and the rotation of the end bell 70 in the reverse direction to the direction illustrated by the arrow a is blocked when the front end portion 81a of the main trunk portion 81 is abutted on the second convex portion 41f in the rotation direction. That is, the rotation is locked and the fitting between the end bell 70 and the barrel 41 is thus completed.

The end bell 70 can be detached from the fitting completion state between the end bell 70 and the barrel 41 to separate the end bell 70 and the barrel 41 from each other in a manner such that the operation portion 86 of the locking member 80 is operated to move the locking member 80 backward against an urging force of the pair of spring pieces 82, and the end bell 70 is rotated in the reverse direction to the direction illustrated by the arrow a while releasing the abutting between the front end portion 81a of the main trunk portion 81 and the second convex portion 41f in the rotation direction so as to locate the end bell 70 on a predetermined position and pull out the end bell 70 from the barrel 41.

As described above, according to this example, the Z-axis direction locking and the rotation locking are performed by fitting the end bell 70 to the cylindrical surface 41c of the barrel 41 and rotating the end bell 70, being able to easily assemble the barrel 41 and the end bell 70. Further, the end bell 70 can be easily detached from the barrel 41 by moving the locking member 80 backward and rotating the end bell 70 in the reverse direction to that in the locking. As a result, if there is a need for replacing the photoelectric conversion module 50 accommodated in the barrel 41, the replacement work can be easily performed.

In addition, according to the plug connector 100 having the configuration described above, the following advantageous effects can be obtained.

Unless an operator moves the locking member 80 backward, neither the rotation locking nor the Z-axis-direction locking can be released, thus being able to prevent locking release which is not intended by the operator.

The locking member 80 includes a member performing a locking function and an urging means (spring) for maintaining locking in an integrated manner, and is thus composed of a single component. Thus, the number of components can be reduced compared to, for example, a configuration including a component performing a locking function and a spring component separately.

There is the cutout 81b at the front end of the main trunk portion 81 of the locking member 80, and the rotation locking can be achieved by rotating the end bell 70 until the second convex portion 41f of the barrel 41 matches and enters the cutout 81b. Thus, the provision of the cutout 81b reduces the rotation angle of the end bell 70 for rotation locking compared to a configuration having no cutout 81b, which simplifies the rotation operation of the end bell 70.

Figure 12B:
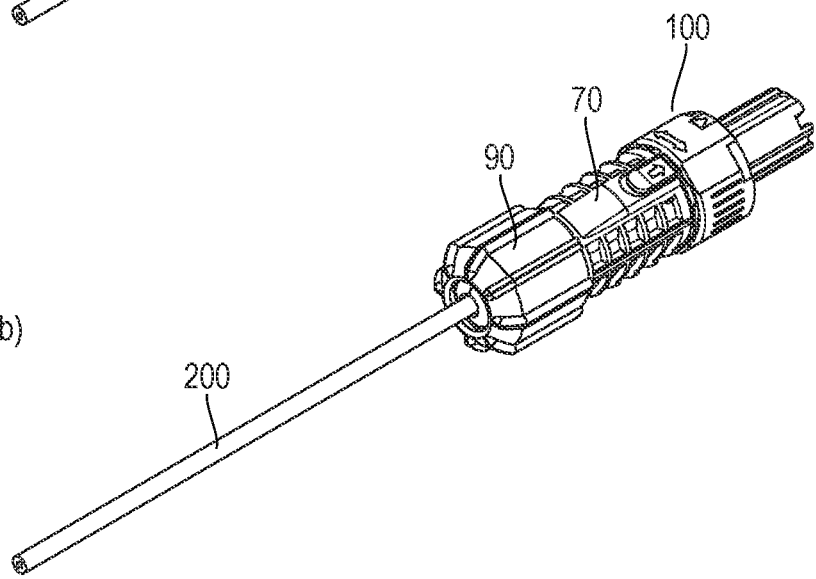
FIG. 12(b) is a drawing illustrating a state in which the assembly of the plug connector is completed.

In the state of FIG. 12(b) in which the plug connector 100 is attached to the optical cable 200, the optical cable 200 is fixed to the end bell 70 with the ring 120 and the bushing 110, which are sandwiched between the ground nut 90 (rear end component) attached from the rear side and fastened to the rear end of the end bell 70 and the end bell 70, interposed therebetween. Therefore, when locking is released to pull out the end bell 70 from the barrel 41, a tensile force acts on the optical cable 200 along with the pulling out of the end bell 70. Accordingly, a tensile force acts on the optical connector 60, which is attached to the optical cable 200 and is connected with the photoelectric conversion module 50, sometimes resulting in a damage of the optical connector 60 and the photoelectric conversion module 50 connected with the optical connector 60. Further, such a damage or poor connection between the optical connector 60 and the photoelectric conversion module 50 can also occur when the end bell 70 is unlocked and pulled out of the barrel 41 for some reason.

In order to prevent such a situation from occurring, for example, a configuration may be employed in which locking cannot be released unless the ground nut 90 is removed. This configuration will be described below with reference to FIG. 16.

In the state in which the locking member 80 is operated to be moved backward as illustrated in FIG. 16(*b*), a rear end 81*c* of the main trunk portion 81 is positioned to slightly protrude from the end bell 70 and overlap with the male screw portion 74. In the fitting completion state (locked state) between the barrel 41 and the end bell 70, the rear end 81*c* is positioned not to overlap with the male screw portion 74 as illustrated in FIG. 16(*a*).

In such a configuration, when the ground nut 90 is attached in the fitting completion state between the barrel 41 and the end bell 70, the rear end 81*c* of the main trunk portion 81 is abutted on the ground nut 90 as illustrated in FIG. 16(*c*) and FIG. 16(*d*), partially omitting the illustration of the end bell 70, and accordingly the backward movement of the locking member 80 is restricted. That is, the backward operation of the locking member 80 is blocked. Thus, the locking cannot be released unless the ground nut 90 is removed.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A plug connector that incorporates an optical connector, the optical connector being attached to an optical cable, and a photoelectric conversion module, the photoelectric conversion module being connected with the optical connector, wherein the optical connector is accommodated in an end bell having a cylindrical shape and the photoelectric conversion module is accommodated in a barrel, the barrel being inserted into a mating receptacle connector, when an axial center of the end bell is assumed to be a Z axis, a Z-axis-direction locking mechanism and a rotation locking mechanism around the Z axis are provided on a cylindrical surface on a rear end side of the barrel and the end bell a front end side of which is fitted to the cylindrical surface, the Z-axis-direction locking mechanism is composed of a first convex portion, the first convex portion being provided on one of the cylindrical surface and an inner circumferential surface on the front end side of the end bell, and a concave portion, the concave portion being provided on the other, and the concave portion is composed of a Z-axis-direction groove, the Z-axis-direction groove guiding the first convex portion, and a circumferential-direction groove, the circumferential-direction groove being formed to be extended from an inner end of the Z-axis-direction groove in a circumferential direction, the rotation locking mechanism is composed of a second convex portion, the second convex portion being provided on the cylindrical surface, and a locking member, the locking member being attached to the end bell in a manner to be movable in a Z-axis direction, the locking member includes a main trunk portion, a pair of spring pieces, a pair of extended pieces, and claws, the main trunk portion elongating in the Z-axis direction, the pair of spring pieces being formed in an extended manner on respective sides of the main trunk portion so that a distance between the spring pieces increases toward a rear side in the Z-axis direction to form a V shape, the pair of extended pieces being formed to be extended frontward in the Z-axis direction on respective sides of the main trunk portion and to have front ends positioned on a rear side in the Z-axis direction compared to a front end of the main trunk portion, the claws being formed on the pair of extended pieces in a manner to protrude outward from each other, and the pair of spring pieces has an elastic restoring force against an external force that reduces a distance between the spring pieces, the locking member is attached to the end bell in a manner such that the claws are caught by locking portions, the locking portions being formed on the end bell, to prevent the locking member from coming off frontward in the Z-axis direction and the pair of spring pieces is sandwiched between side walls of a concave groove from respective outer sides, the concave groove being formed on a circumferential wall of the end bell to be extended in the Z-axis direction and being formed to have a rear end side narrowed toward a rear side in the Z-axis direction, when the end bell is fitted to the barrel at a predetermined position around the Z axis, the first convex portion is inserted into the Z-axis-direction groove and the front end of the main trunk portion is abutted on the second convex portion to push the locking member backward in the Z-axis direction, and a state in which ends of the pair of spring pieces are positioned in a narrow portion of the concave groove is accordingly generated, when the end bell is rotated from the state to one direction around the Z axis by a predetermined angle, the first convex portion is positioned on the circumferential-direction groove and the barrel and the end bell are locked in the Z-axis direction, and the front end of the main trunk portion is disengaged from the second convex portion and the locking member is urged by the elastic restoring force of the pair of spring pieces so as to move frontward in the Z-axis direction, and accordingly rotation of the end bell in a reverse direction to the one direction is blocked when the main trunk portion is abutted on the second convex portion in a rotation direction around the Z axis, and a fitting completion state is thus generated, and the end bell can be detached from the barrel in a manner such that the end bell is rotated in the reverse direction to the one direction so as to locate the end bell on the predetermined position while operating the locking member to move the locking member backward against an urging force and releasing abutting between the main trunk portion and the second convex portion in the rotation direction in the fitting completion state.

2. The plug connector according to claim 1, wherein a rear end component that can be attached to the end bell from a rear side of the end bell is provided, and when the rear end component is attached to the end bell in the fitting completion state, a rear end of the main trunk portion is abutted on the rear end component to restrict backward movement of the locking member and a backward operation of the locking member is blocked.

\* \* \* \* \*